Nov. 7, 1961 G. F. SQUASSONI ET AL 3,007,369
PHOTOGRAPHIC REPRODUCING MACHINE
Filed Aug. 2, 1956 14 Sheets-Sheet 1

FIG. I

INVENTOR.
GINO F. SQUASSONI
JAMES C. PLASTARAS
BY
ATTORNEYS

FIG. 4

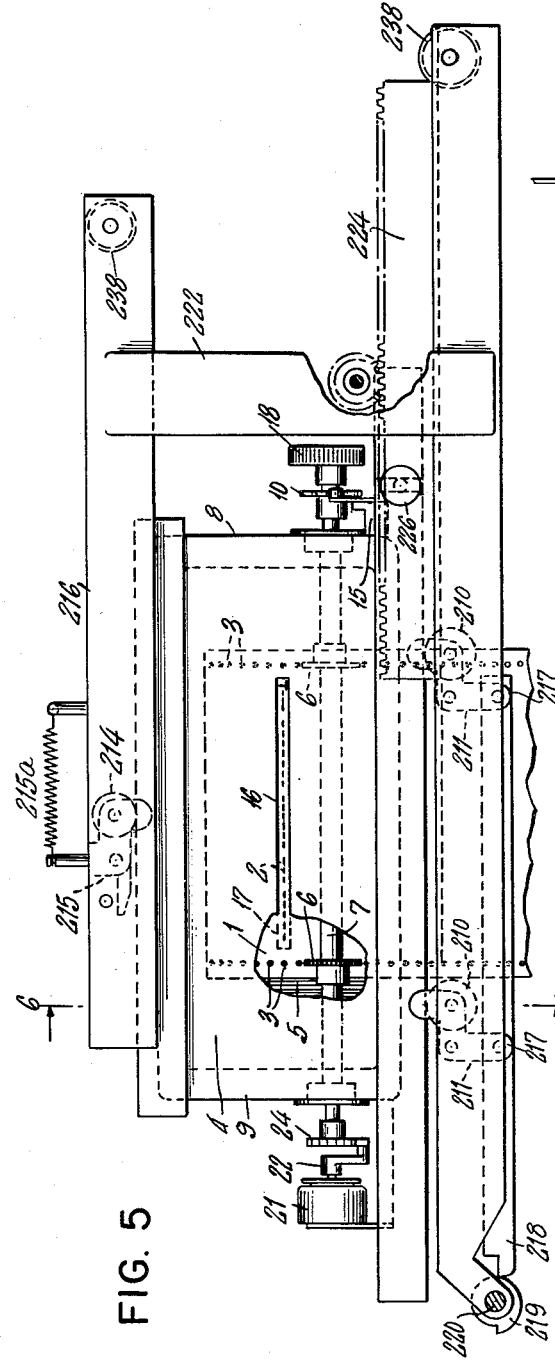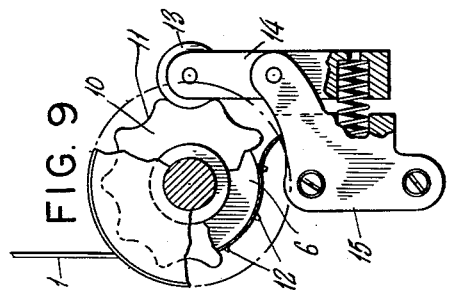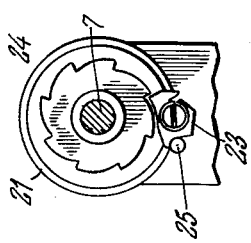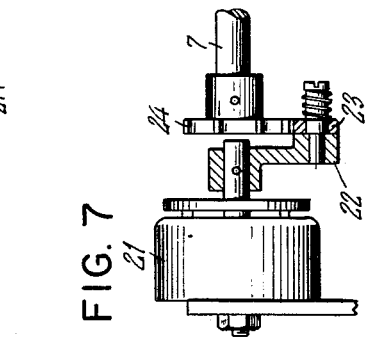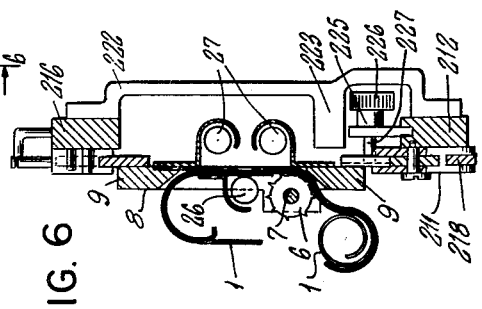
INVENTOR.
GINO F. SQUASSONI
JAMES C. PLASTARAS
BY
ATTORNEYS

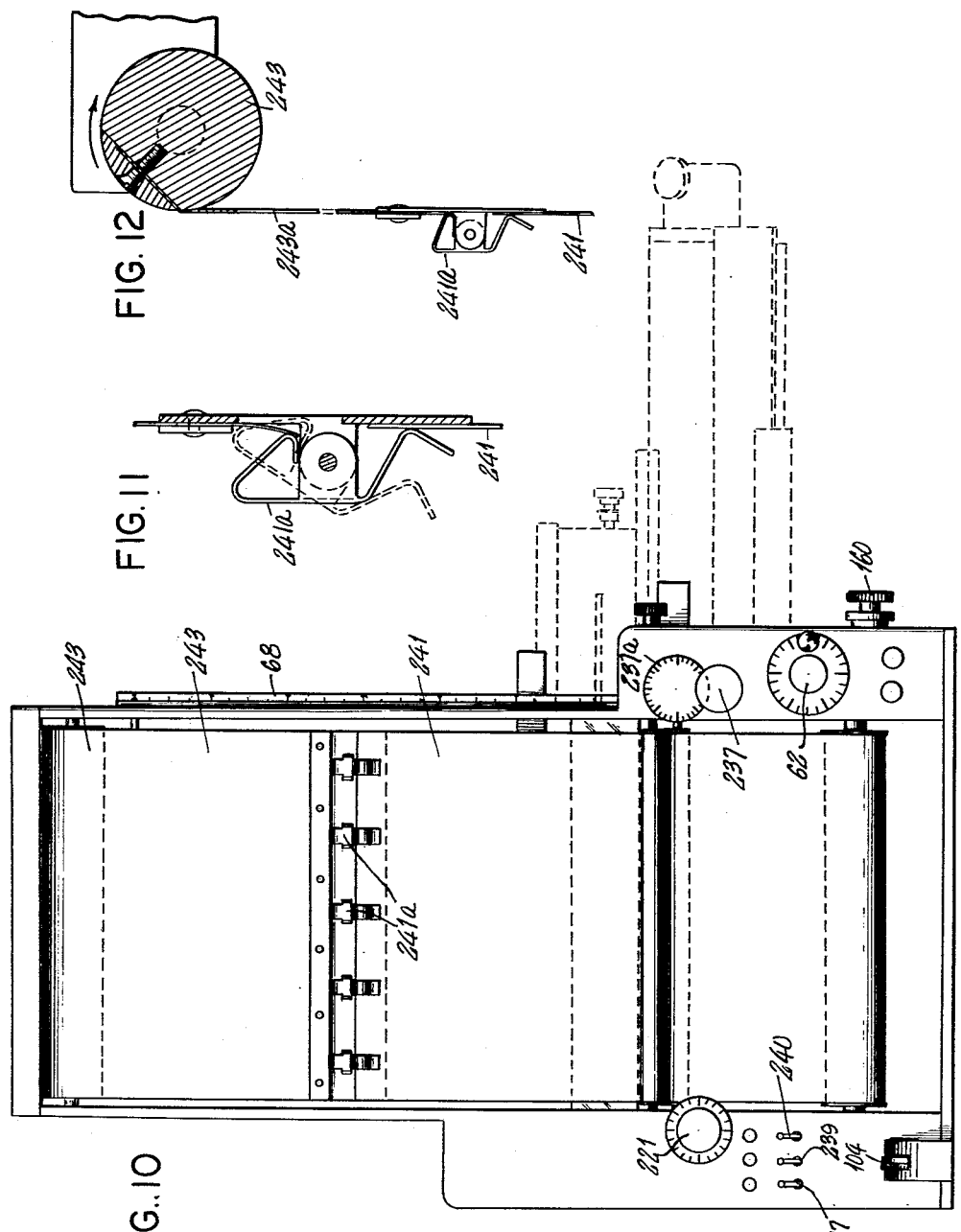

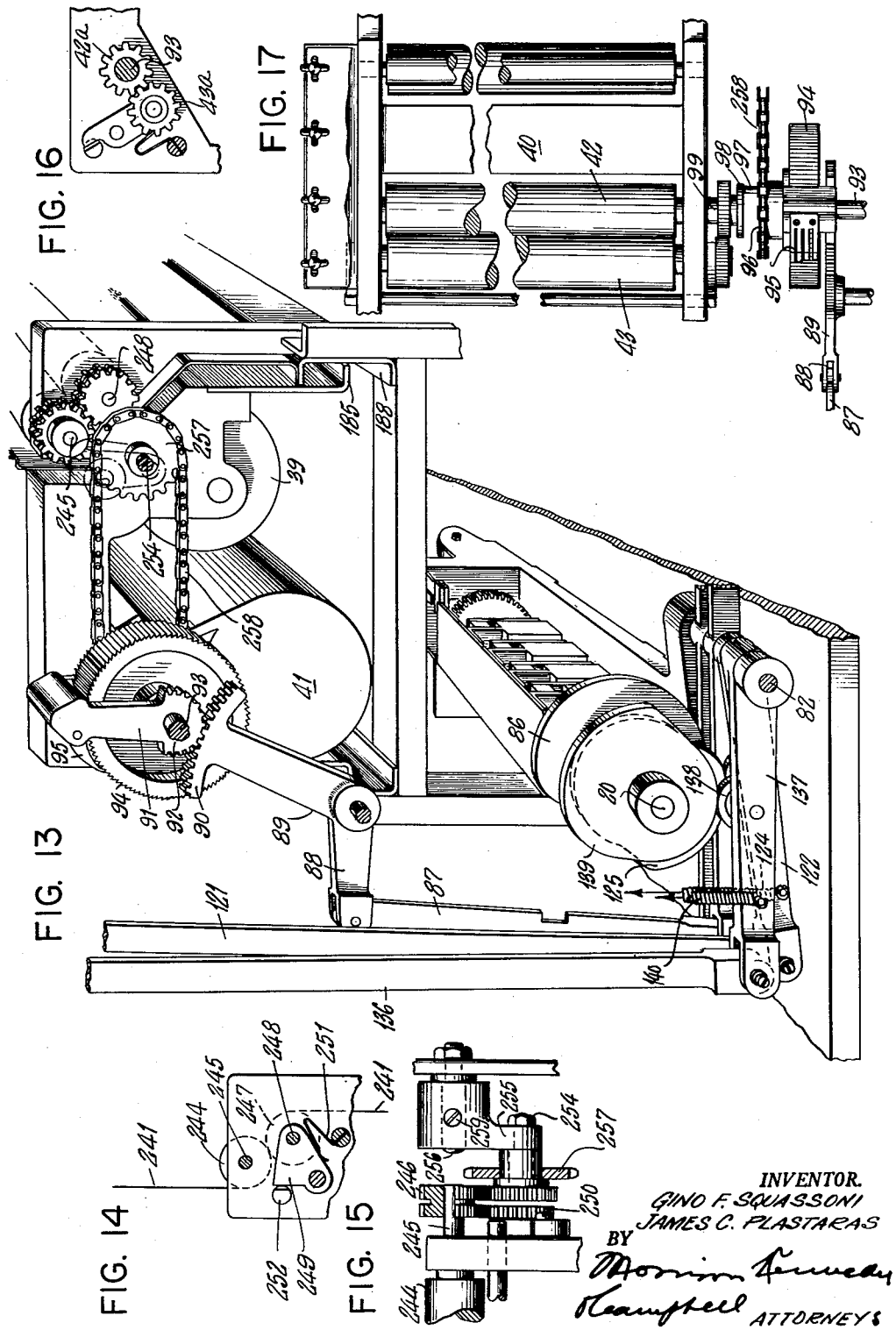

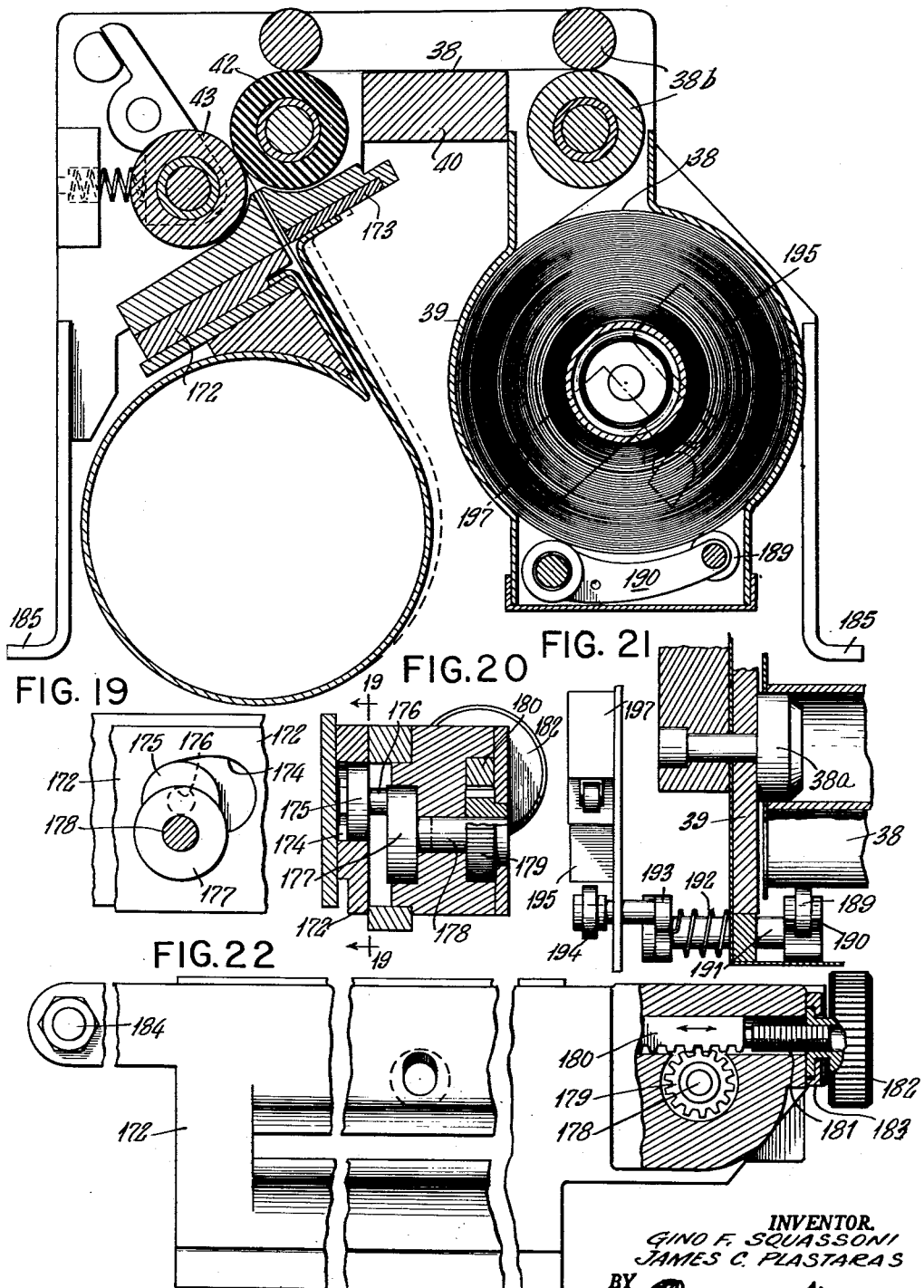

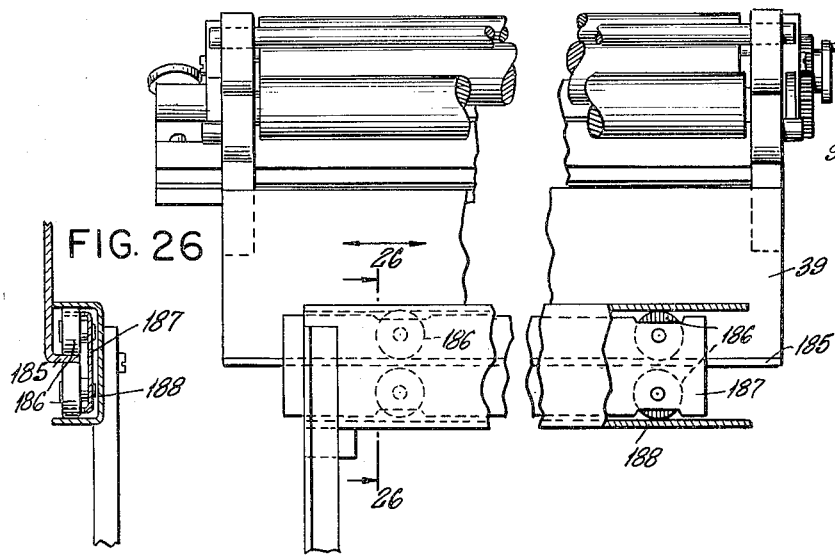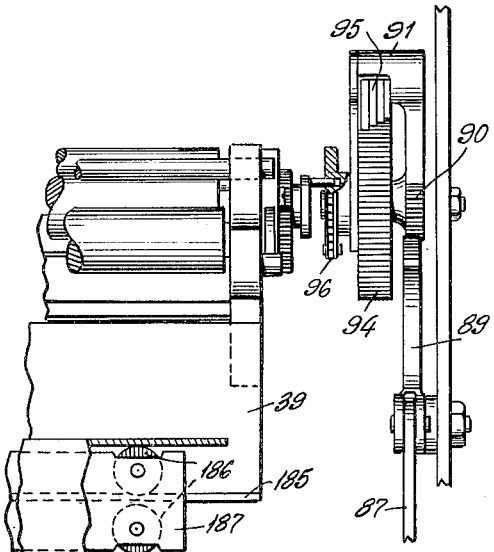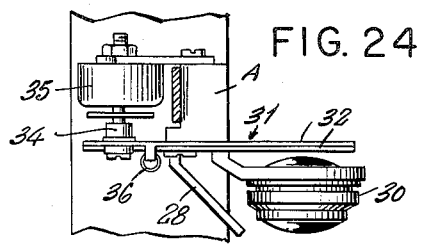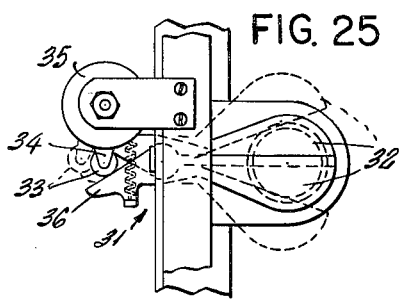

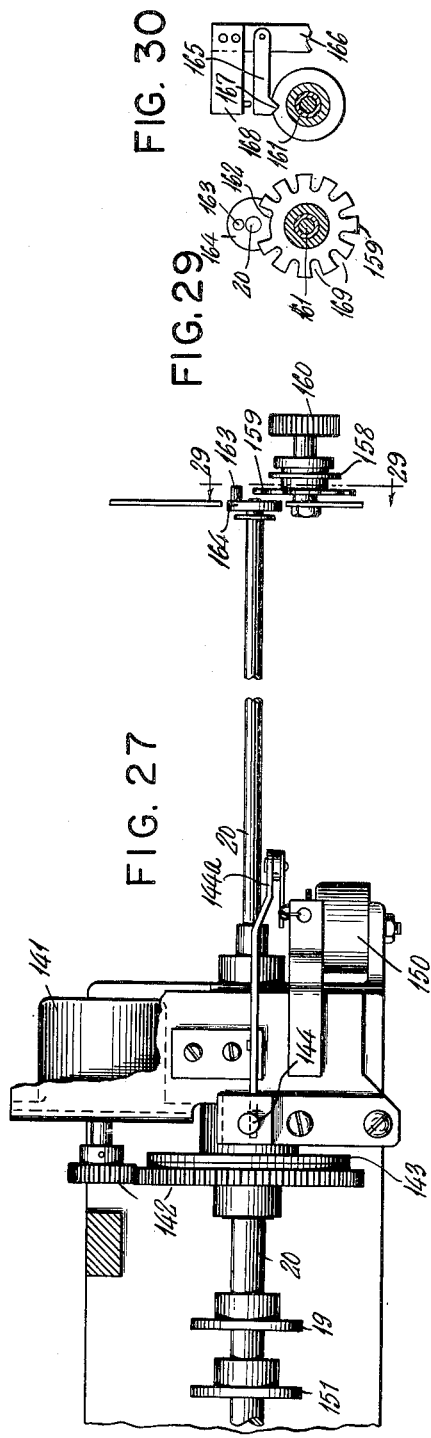
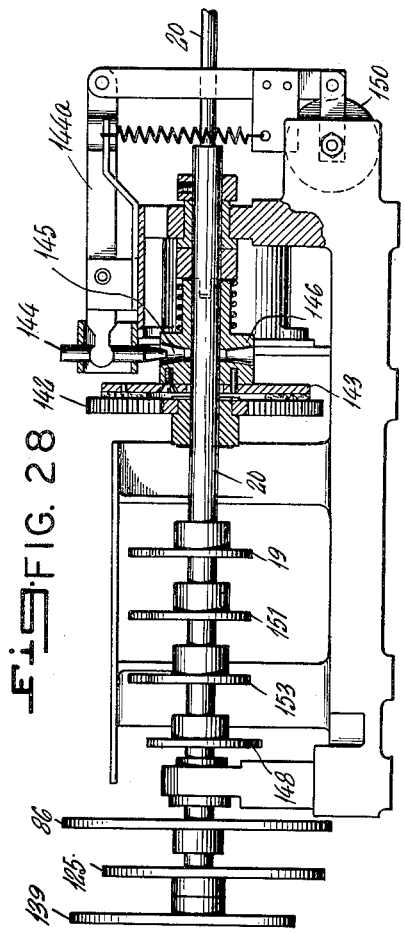

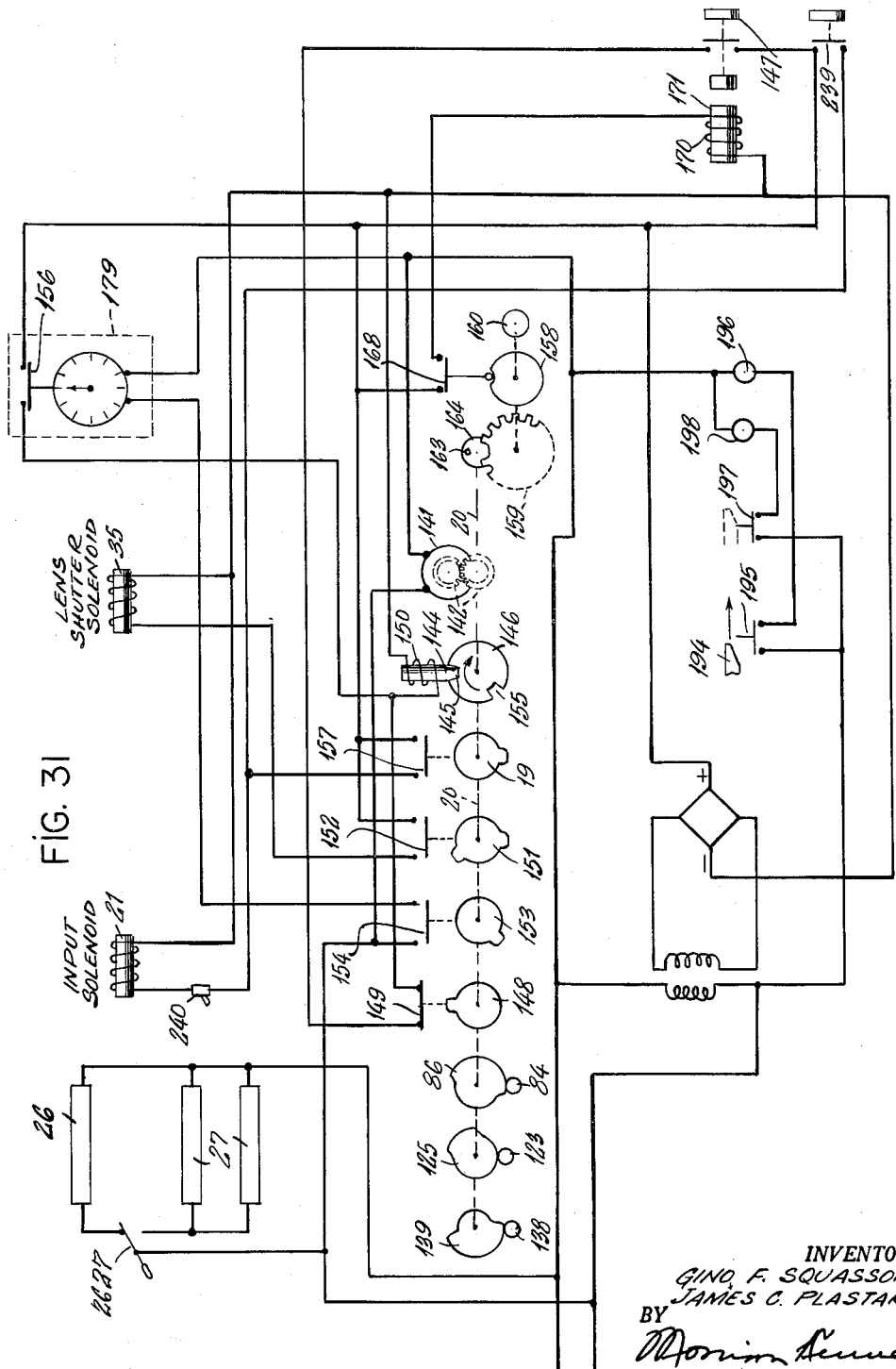

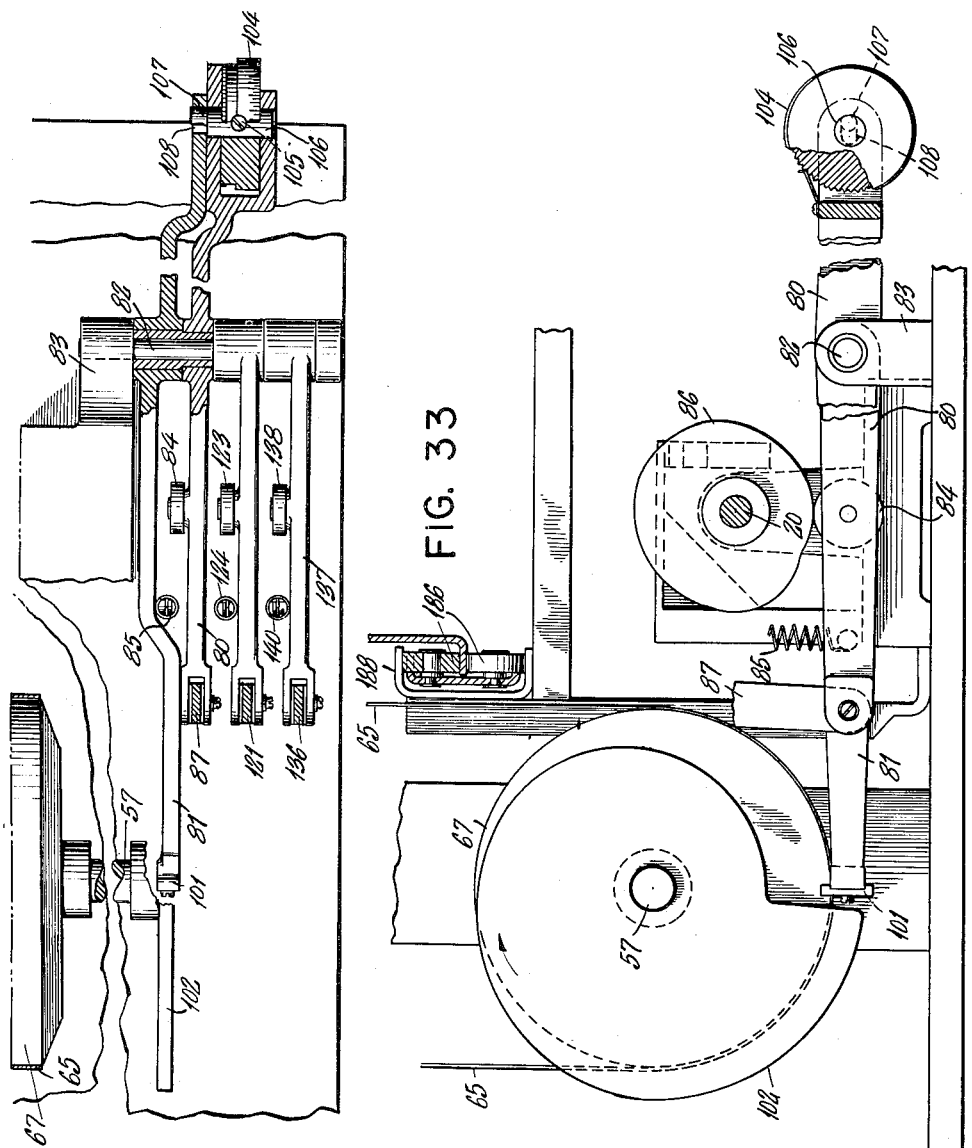

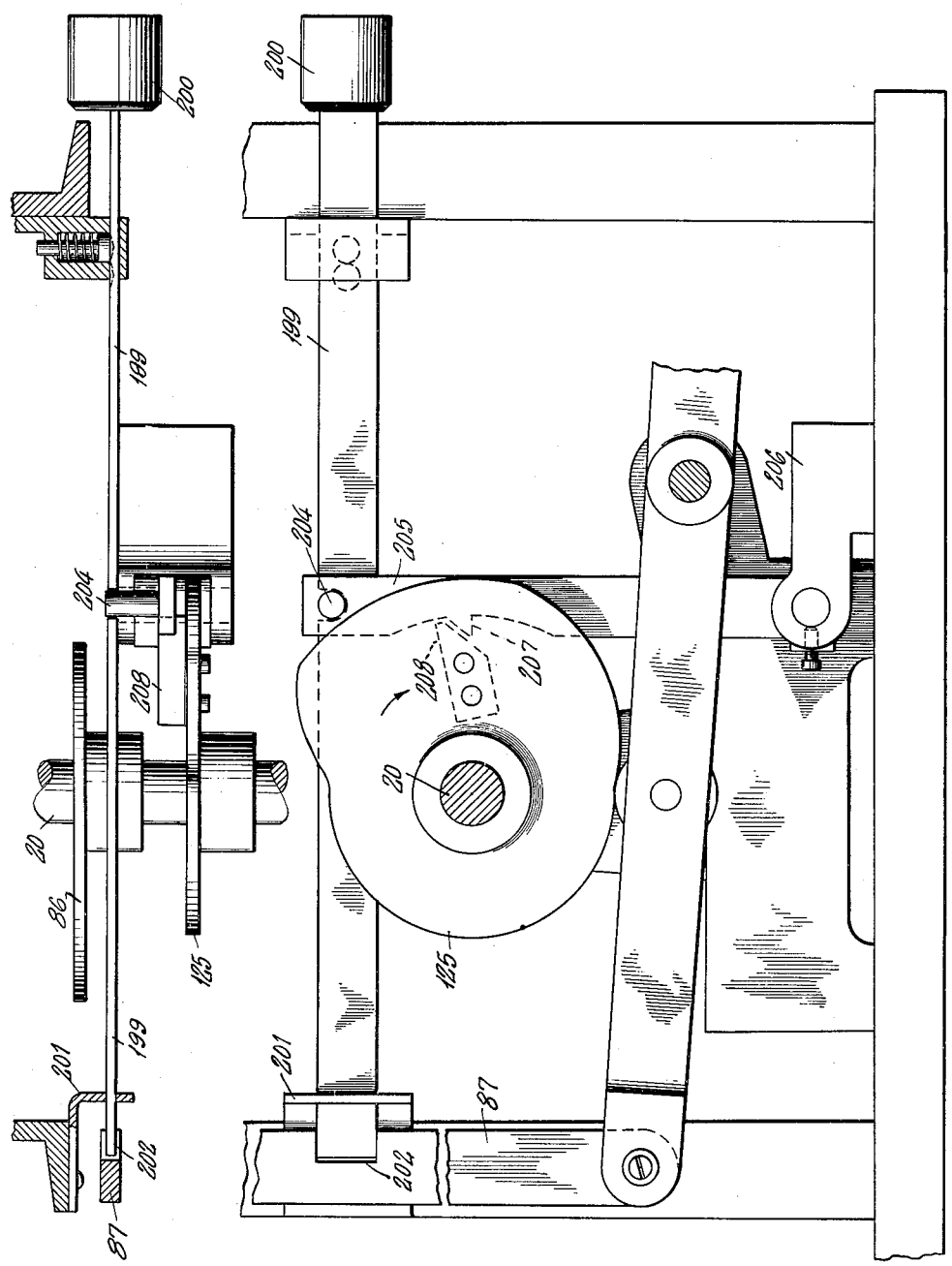

Nov. 7, 1961    G. F. SQUASSONI ET AL    3,007,369
PHOTOGRAPHIC REPRODUCING MACHINE
Filed Aug. 2, 1956    14 Sheets-Sheet 14

INVENTOR.
GINO F. SQUASSONI
JAMES C. PLASTARAS
BY

ATTORNEYS

United States Patent Office 3,007,369
Patented Nov. 7, 1961

3,007,369
PHOTOGRAPHIC REPRODUCING MACHINE
Gino F. Squassoni and James C. Plastaras, Lynbrook, N.Y., assignors to Mergenthaler Linotype Company, a corporation of New York
Filed Aug. 2, 1956, Ser. No. 601,781
17 Claims. (Cl. 88—24)

This invention is directed to a photographic reproducing machine, and more particularly to a machine designed to receive a photographic strip or film, as prepared in a photocomposing machine, and create reproductions of the composed type lines in different point sizes and arrangements upon a second film to be used for printing purposes.

In general, the output of presently known photocomposing machines consists of a strip or film having the type lines arranged thereon in column form.

For the printing of books, periodicals, etc., such a strip or film is entirely satisfactory, since it is a fairly simple matter to use the strips as they are delivered from the photocomposing machine and assemble or make them up in page form as a step preparatory to the creation of a printing member.

For other types of printing, however, the output of such photocomposing machines is not so satisfactory, because the strips cannot be used for page make-up purposes in the form they are photographed. For example, when making up a page containing headings, advertising matter, etc., the lines of type as they appear on the strip frequently must be enlarged or reduced in size. Moreover, they frequently must be rearranged with respect to one another as well as with respect to inserts forming part of the advertising matter.

The present machine will take care of practically all forms of printing without having to indulge in the usual practice of photographing lines of different sizes and then cutting up the film into sections which must later be assembled by hand in making up the page form. In other words, the new machine is designed to produce an output strip which can be used directly for printing purposes, even though the type lines may vary in point size or spacing and even though the type lines will appear in different columns or in different offset relations. This output strip will be produced photographicaly from an input strip as prepared in any usual way in a photocomposing machine.

In the operation of the improved machine, the input strip is fed step by step to present the type lines, one after another, into photographic position. As each type line is thus presented, the light rays transmitted by an optical system (consisting of a lens unit and a set of reflecting mirrors) form a developable image of the desired point size upon the photosensitive output strip. While the step by step advance of the input strip is uniform, the step by step advance of the output strip will be varied to accord with the point size of the reproduction. The input strip is mounted for lateral adjustment, so that the image of the type line in photographic position may appear in different lateral locations or columns on the output strip. In such cases, it will be understood that the width of the output strip will be greater than that of the input strip; in fact, the width of the output strip will ordinarily correspond to the width of the page to be printed. The arrangement is also such that the advance of the output strip will be interrupted between photographic actions in order to allow different type lines on the input strip to appear at the same level or in side by side relation on the output strip. The input strip is also adjustable vertically to a limited extent so as to vary the vertical position of a line on the output strip.

In order to vary the point size of the reproduced type lines, provision is made for changing the object distance and the image distance by adjustment of the reflecting mirrors with reference to the lens unit and the output strip. The length of the mirrors will accord with the width of the output strip in order to permit the lateral adjustment of the input strip.

As a guide to the operator in making up the output strip, a viewing screen is located at the front of the machine and an image of each type line is formed on the screen before the machine is set into operation. The same set of mirrors is used in forming this image, although the mirror which reflects the image upon the screen is later shifted to an inactive position before the photographic action takes place.

As a further guide to the operator in making up the output strip, a translucent sheet of paper is fed through the machine in front of the viewing screen, this sheet preferably being marked to indicate the point size and relative positions of the type lines to be reproduced according to the make-up of the page to be printed.

The machine embodies many other features of importance but these will best be understood from the detailed description to follow. The machine is largely automatic, performing its various functions in a certain predetermined sequence at each cycle of operation. When it is desired merely to reproduce the type lines of the input strip in straight column formation, either of the same point size or of a different point size, the machine can be set to do that and then allowed to operate continuously for the desired number of lines.

Referring to the drawings:

Figure 4:
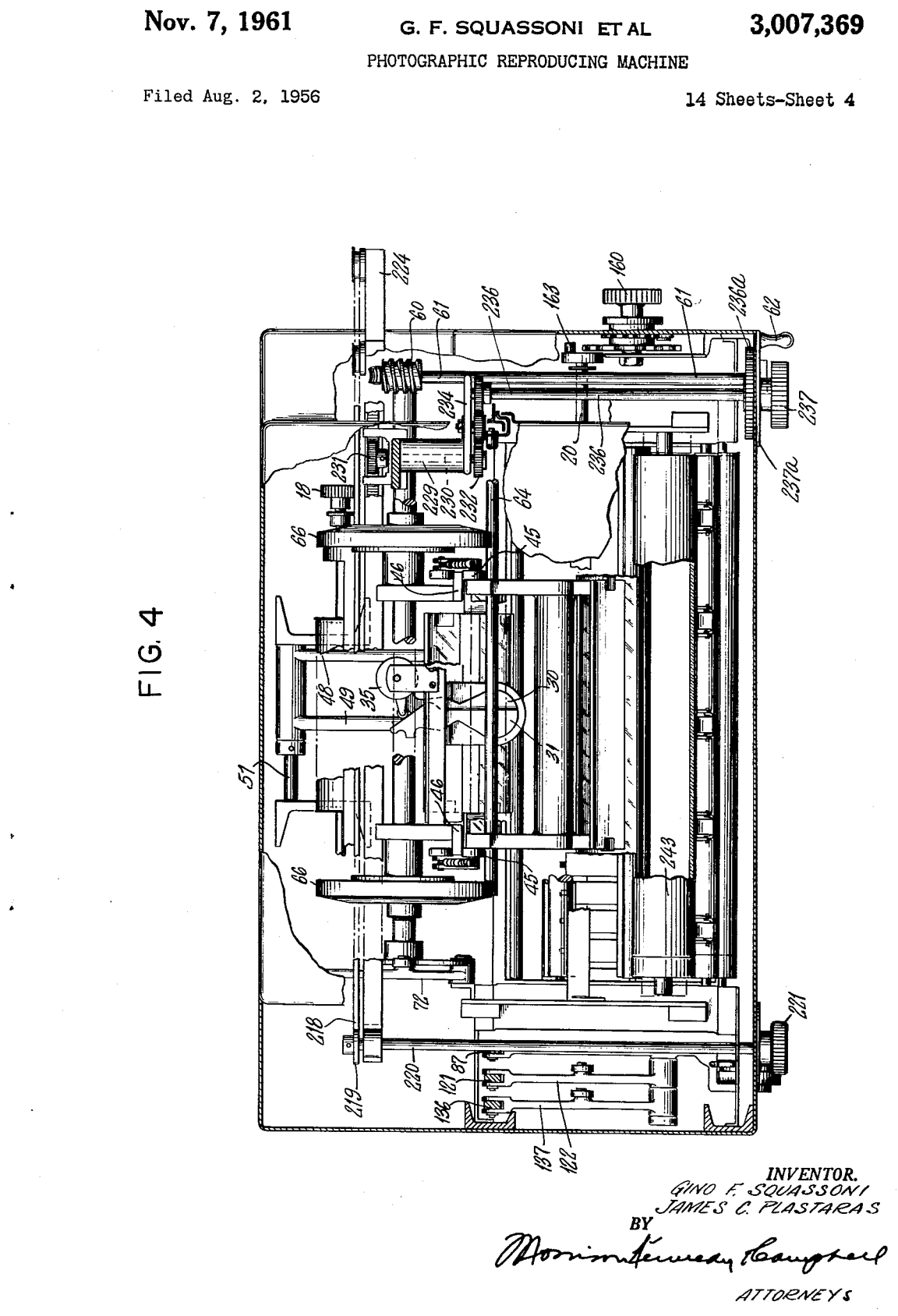

FIG. 4 is a top plan view of the machine with parts removed for clarity;

FIG. 5 is a front elevation of the input strip carriage and mounting;

FIG. 6 is a section taken on the line 6—6 of FIG. 5;

FIG. 7 is a detail of the input strip feed solenoid and its ratchet;

FIG. 8 is an end view of FIG. 7;

FIG. 9 is a detail view of the input strip detent;

FIG. 10 is a front elevation of the complete machine;

FIG. 11 is a detail view of the means for securing the translucent paper sheet to the takeup roll;

FIG. 12 is a view similar to FIG. 11 but showing the takeup roll;

FIG. 13 is a perspective view of the output strip drive;

FIG. 14 is a detail of the translucent paper sheet feed;

FIG. 15 is another view showing the translucent paper sheet feed;

FIG. 16 is a detail view of the output strip drive gears;

FIG. 17 is a top plan view of the output strip drive;

FIG. 18 is an enlarged sectional view through the output strip mechanism;

FIG. 19 is a detail view of the output strip cutters, taken on the line 19—19 of FIG. 20;

FIG. 20 is a cross-section taken through the cutters;

FIG. 21 is a plan view of the output strip detector;

FIG. 22 is a top plan view of the output strip cutter unit;

FIG. 23 is a rear elevation of the output strip unit and its drive;

FIG. 24 is a side elevation of the lens and shutter unit;

FIG. 25 is a top plan view of the lens and shutter unit;

FIG. 26 is a section taken on the line 26—26 of FIG. 23;

FIG. 27 is a top plan view of motor drive and clutch for the main cam shaft;

FIG. 28 is a front elevation of the entire main cam shaft and drive;

FIG. 29 is a detail view of the Geneva wheel control for the main cam shaft, taken on line 29—29 of FIG. 28;

FIG. 30 is a detail of the switch associated with the Geneva wheel control;

FIG. 31 is a circuit diagram showing how the parts are controlled and operated;

FIG. 32 is a top plan view of the lever arrangement for the output strip feed, viewing mirror and shutter;

FIG. 33 is a side elevation of FIG. 32;

FIG. 34 is a top plan view of the output strip feed stop;

FIG. 35 is a side elevation of FIG. 34;

Figure 1:
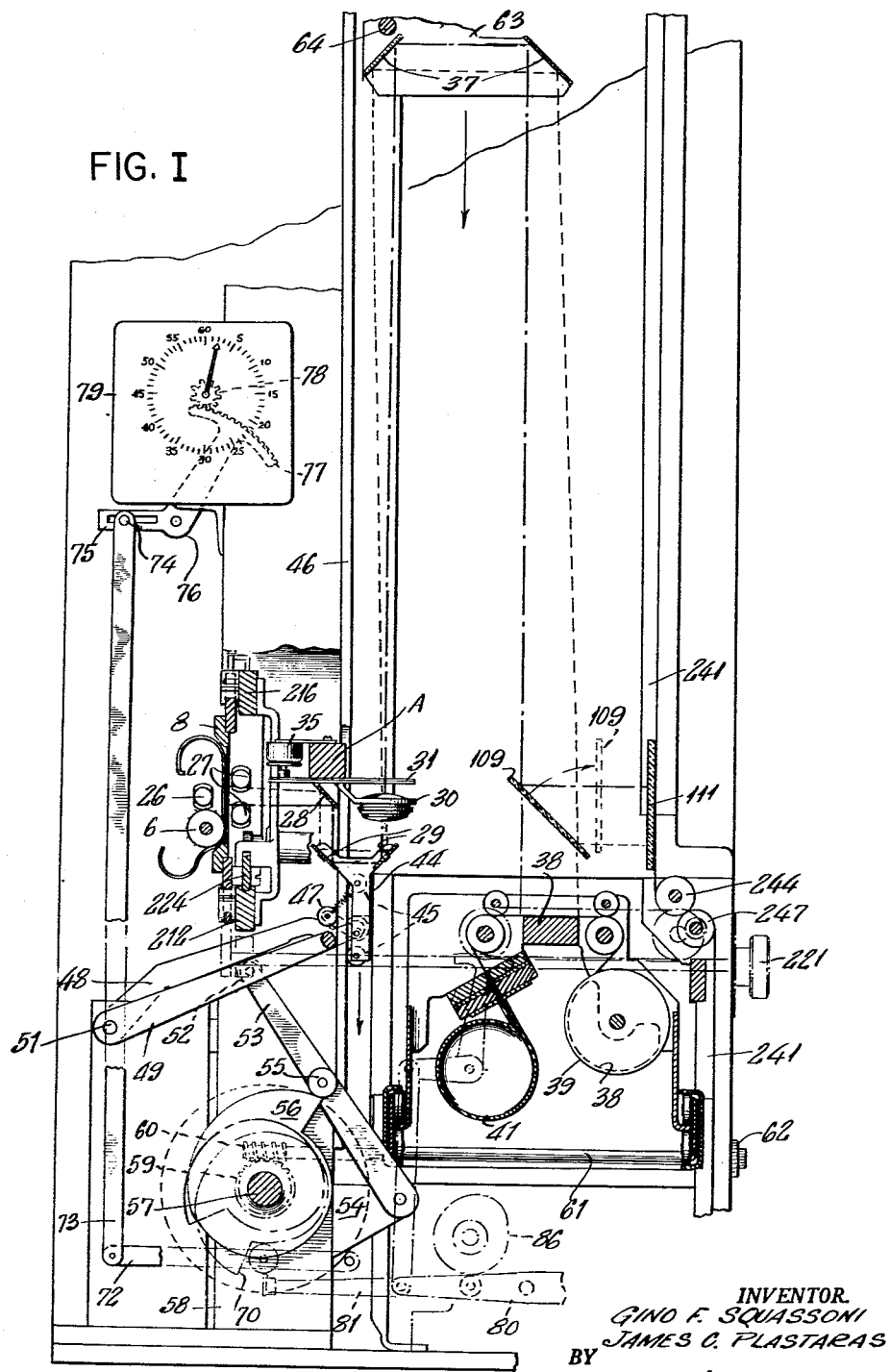
FIG. 1 is a side elevation, partly in section and with parts removed for clarity, of the improved machine.

As shown in FIGS. 5 and 6, the usual output from a photocomposing machine (e.g. a machine of the type disclosed in a copending application Serial No. 419,012, filed March 26, 1954) comprises a strip of film or paper 1 in which a plurality of lines of type matter 2 have been photographed in column form. In addition, this strip of film or paper 1 is usually provided with perforations 3 (see FIG. 5) located at the opposite ends of each line.

However, when preparing a strip for use in the present machine, it is desirable that additional perforations of the same pitch be provided in the leading end thereof to precede the first composed line and in the trailing end thereof to follow the last composed line, these additional perforations being intended to simplify the operation of inserting the strip into and removing it from the machine.

Also, when preparing the strip of film or paper for use in the present machine, the distance between the successive lines and hence the distance between successive pairs of perforations is preferably the maximum that the machine is capable of accommodating regardless of the point size of the type composed.

Furthermore, the strip should preferably be created in negative form, that is to say, with transparent characters on an opaque background in the case of a film, or with white characters on a black background in the case of a paper strip.

The strip of film or paper 1, whether it be either in roll form or a short section thereof, is fed downwardly (with the type lines upside down or inverted) between a pair of guide plates 4 and 5 (see FIG. 5) carried by a frame member 9 and is trained over a pair of sprocket wheels 6 mounted on a shaft 7 journaled in the end plates of a movable carriage 8 of which the frame member 9 comprises a component part. The shaft 7 also carries a detent wheel 10 (see FIG. 9) having the same number of detents 11 as there are teeth 12 on the sprocket wheels 6. This detent wheel 10 is positioned in front of a roller 13 carried by a spring biased lever 14 pivotally secured to a bracket 15 on the frame member 9, the arrangement being such that when the roller 13 is seated in a detent 11 the shaft 7 is held stationary with the type line 2 to be reproduced located in photographic position between two horizontally aligned apertures 16 and 17 formed in the guide plates 4 and 5, respectively. At the right end thereof, the shaft 7 is provided with a knob 18 by means of which the shaft 7 and the sprocket wheels 6 thereon may be turned manually, when loading the input strip into the machine, to bring the first line thereon to the photographic station. Thereafter, the strip is advanced automatically in step-by-step fashion to bring each succeeding line thereon to the photographic station.

The automatic step-by-step advance of the film is effected by means of a cam 19 (see FIG. 31) on the cam shaft 20 which during each rotation closes a circuit through a rotary solenoid 21 (see FIGS. 3, 5, 7 and 8). This solenoid has a depending arm 22 that carries a spring pressed pawl 23 which engages and advances a ratchet wheel 24 secured to the shaft 7 at the left end thereof each time the solenoid is energized. In order that the shaft 7 may be turned manually and in either direction, if need be, the pawl 23 is held normally disengaged from the ratchet wheel by a stop pin 25 that engages a cam surface on the pawl 23 when the solenoid is deenergized and in its normal position of rest.

When the input strip is in the form of a negative film, the image is illuminated by transmitted light from a slender luminous tube 26 (FIGS. 1 and 6) which is secured at its ends to the sides of the frame member 9 in back of and near to the input strip. This tube 26 may be either a fluorescent or a cold cathode tube. When the input sheet is a paper negative, the image is illuminated by means of two luminous tubes 27 of either of the two types mentioned above. These tubes are also secured at their ends to the sides of the frame member 9 and are positioned above and below the aperture 16 in the front guide plate 4. Of course, if the input strip is a negative film, the light transmitting tube 26 is turned on and the two light reflecting tubes 27 are turned off, a suitable switch 2627 being provided for this purpose. Conversely, if a paper negative is used, the two light reflecting tubes are turned on and the light transmitting tube is turned off.

The light, whether it be transmitted through the type line image or reflected by said image, is deflected by a mirror 28 (see FIG. 1) mounted at an angle of 45° on a fixed brack A secured to the main frame of the machine. The light rays are first deflected downwardly by the mirror 28 and then upwardly by a pair of oppositely disposed 45° angle object mirrors 29 mounted as hereinafter described. The upwardly deflected light rays are intercepted by a lens assembly 30 which comprises a pair of spaced lenses carried by the same fixed bracket A. Preferably this lens assembly is so positioned that when a type line on the input strip is brought to the photographic station, the upper case type characters will be aligned at the top on the optical axis (the type line being right side up or uninverted). The lens assembly is provided with a shutter 31 (see FIGS. 24 and 25) which comprises a pair of plates 32 rotatably mounted intermediate their ends in scissor-like fashion on a stud carried by the bracket. A roller 33, carried by the arm 34 of a rotary solenoid 35, is positioned between the ends of the shutters 32 and serves, when the solenoid is energized, to close the shutters against the action of a spring 36. When the shutters are open, the light rays are directed by the lens assembly upon a pair of image mirrors 37 (FIG. 1) and are deflected downwardly thereby onto an output strip 38 of light sensitive material. This strip is mounted in roll form on a spindle 38a journaled in the side plates of a light tight housing 39 positioned in the lower portion of the machine.

The strip 38 is directed from its roll through guide rolls 38b and over a platen 40 (see FIG. 18) secured at its ends to the sides of the housing 39 and then is fed downwardly into a hopper 41 by means of a plurality of sets of rollers, one of which is a power driven roller 42 and another of which is a spring-loaded roller 43, the latter serving to maintain the strip in driving engagement with the power driven roller. These rollers 42 and 43 are connected together by a pair of gears 42a and 43a, respectively (see FIG. 16).

As the light rays are thus projected onto the strip 38, a reproduction of the image on the negative strip 1 is created thereon. In order that this reproduction may be enlarged or reduced as desired, means are provided for adjusting the object distance and the image distance prior to the inauguration of a machine cycle of operations. Accordingly (FIG. 1), the two object mirrors 29 are mounted on a vertically movable block or carriage 44. At each of its ends, the block is provided with three rollers, two of which rollers 45 are mounted on studs carried by the block 44 and ride against the front face of a vertically disposed rail 46 fixed to the machine frame. The third roller 47 rides against the rear face of the rail. This roller 47 is carried by a link pivoted to the block and is spring-biased to insure true vertical movement of the mirrors carried by the block. A pair of arms 48 and 49 are connected together as a unitary lever by means of a sleeve which is rotatably mounted on a transverse rod 51 carried by two upright members secured to the base of the machine (FIG. 4). The unitary lever 48, 49 (see particularly FIG. 3) is provided at its forward end with two rollers upon which rests the straight horizontal lower edge of the mirror carriage 44, these rollers serving to maintain a true horizontal alignment of the mirror assembly as it is raised and lowered in its vertical adjustment. The arm 48 rests on a roller 52 carried by a lever 53 at the upper end thereof. This lever 53 is pivotally secured at its lower end to a bracket 54 fixed to the machine frame. Intermediate its ends, the lever 53 is provided with a roller 55 that rides on a cam 56 secured to a transverse shaft 57 journaled in two upright members 58 mounted on the base of the machine. The shaft 57 is provided with a worm wheel 59 which meshes with a worm 60 on a shaft 61 extending rearwardly from beyond the front face of the machine. At its forward end, the shaft 61 is provided with a hand wheel 62 which when turned rotates the cam 56 in one direction or another and in so doing increases or decreases, by the adjustment of the mirrors 29, the object distance between the image on the input strip and the lens assembly as may be desired.

The two image mirrors 37 are likewise carried by a vertically movable block or carriage 63 which is adjustable on the same two upright rails 46 in the same manner as the lower block 44, in order to insure true vertical movement of the image mirrors. That is to say, the block 63 is provided at each of its ends with three rollers (not shown), two of which ride against the front and the third of which is spring-biased and rides against the rear face of the rails 46. The block 63 carries a transverse rod 64 (see FIG. 3) which at each of its ends is riveted or otherwise secured to endless bands 65 trained over upper and lower pulleys 66 and 67, the two upper pulleys 66 being mounted on a shaft carried by the two upright members to which the rails 46 are secured, and the two lower pulleys 67 being mounted on the aforementioned shaft 57 which carries the cam 56 and worm wheel 59. In consequence, when the hand wheel 62 is turned to adjust the object mirrors 29 upwardly or downwardly, the image mirrors 37 carried by the upper block 63 are simultaneously adjusted in the same direction. With this arrangement, the object mirrors and the imaging mirrors may be moved towards and from the lens assembly 30 to lengthen and shorten the object and imaging distances and thus focus the type line image into the output strip 38 with the desired point size. It will be recalled that the input strip 1 was positioned for top alignment of the type line on the optical axis. In consequence, the same alignment will be reproduced on the output strip 38.

Figure 2:
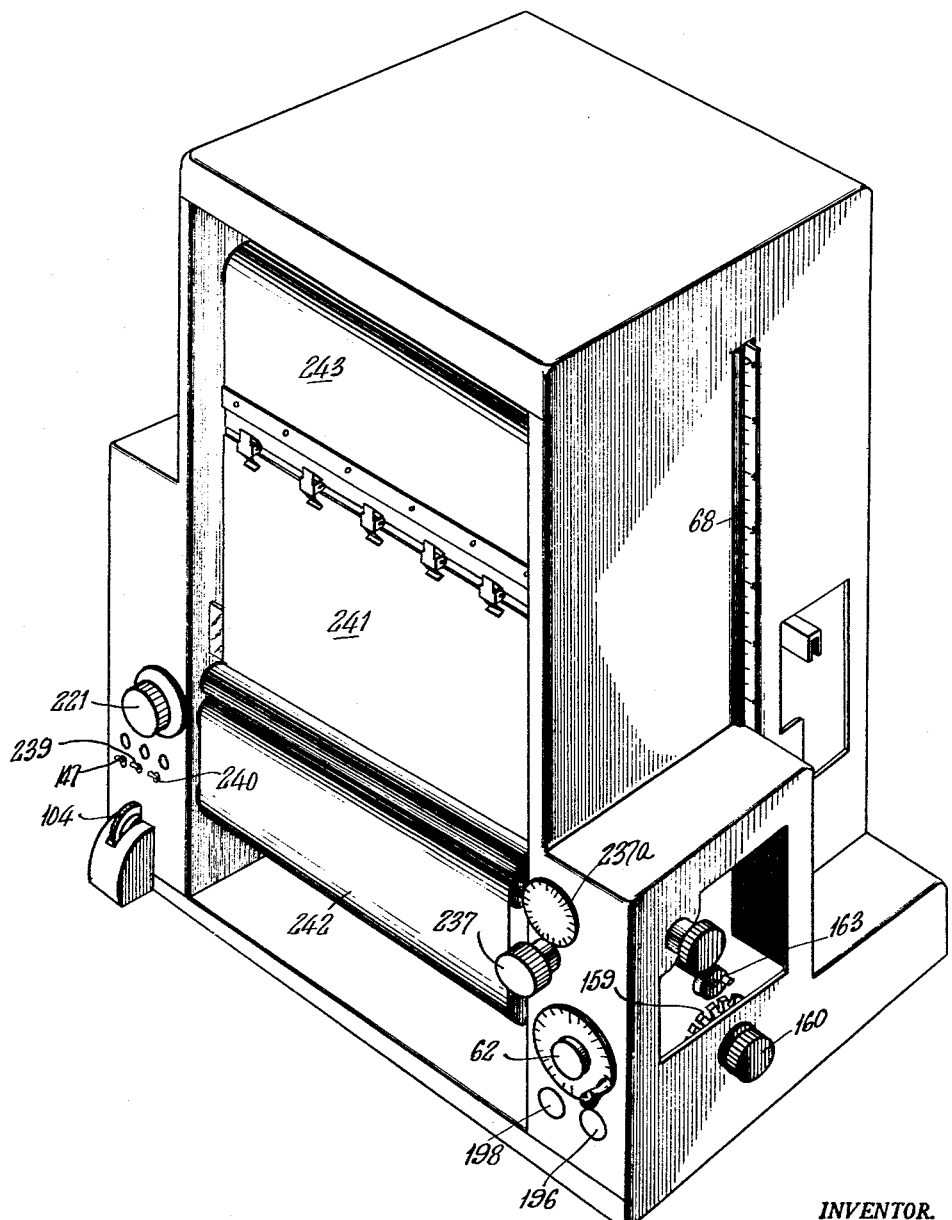
FIG. 2 is a perspective view of the complete machine.
Figure 3:
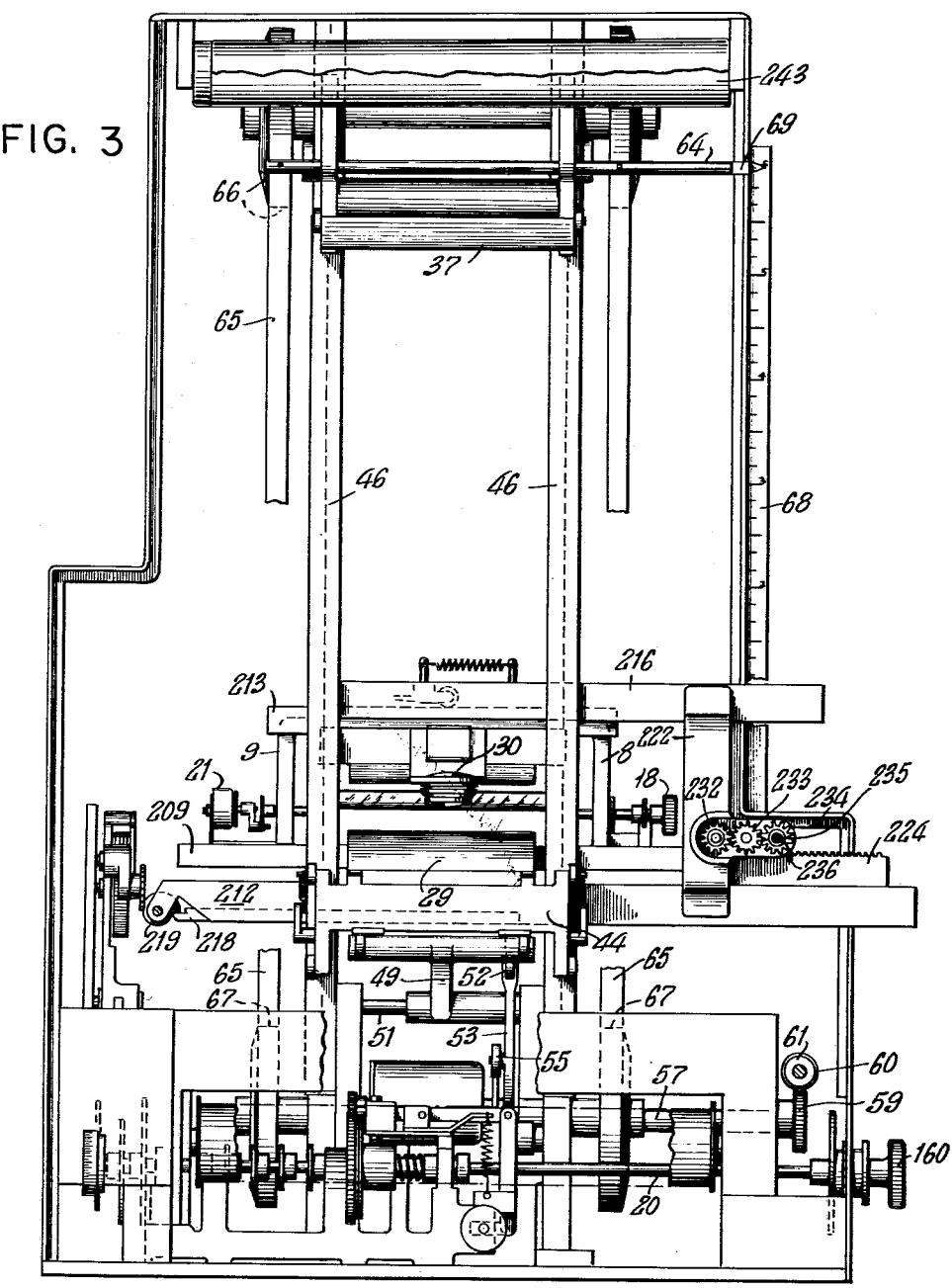
FIG. 3 is a front elevation of the machine with parts removed for clarity.

In order that the machine may be easily set to create reproductions of a desired point size, a vertical scale 68, graduated in units of point size, is positioned at the right hand side of the machine for cooperation with a pointer 69 carried by the rod 64 to which the endless bands 65 are connected (see FIGS. 2 and 3). In addition, the hand wheel 62, which effects the adjustment of the mirrors, is graduated in fractions of point size for finer adjustments.

Since the time of exposure should vary with the ratio of change of point size, a cam 70 devoted to this purpose is also mounted on the shaft 57. A roller 71, carried by a pivotally mounted lever 72, rides against this cam 70. At its rear end, the lever 72 is pivotally connected to a vertically disposed link 73 at the lower end thereof. At its upper end, the link 73 is adjustably connected by a pin and slot arrangement 74 to one arm 75 of a pivotally mounted bell crank lever 76. The other arm of the lever 76 is provided with a gear segment 77 that meshes with a gear 78 which, when rotated, sets a time exposure meter 79. The timing of the meter 79 may be controlled to accord with the speed of various emulsions by adjusting the pin and slot arrangement 74. In consequence, as the point size is adjusted, the time of exposure is simultaneously adjusted.

After each exposure, the output strip 38 is advanced one step to bring a fresh unexposed portion thereof into photographic position. The distance the strip is advanced must also accord with the point size of the reproduction. Accordingly, a pair of levers 80 and 81 (see FIGS. 32 and 33) are rotatably mounted intermediate their ends on a shaft 82 supported in a bracket 83 secured to the base of the machine. At their forward ends, the levers 80 and 81 are coupled together in a manner subsequently described so that they may be rotated about the shaft 82 as a unit. Between its pivotal axis and the rear end thereof, the lever 80 is provided with a roller 84 which, by means of a spring 85, is maintained in engagement with an overlying cam 86 mounted on the main cam shaft 20 of the machine. At its rear end, the lever 80 is pivotally connected to a vertically disposed link 87 at the lower end thereof. At its upper end, the link 87 is pivotally connected to one arm 88 of a bell crank lever 89 (see FIG. 13). The other arm of the bell crank lever 89 is provided with a gear segment 90 meshing with another gear segment formed on one arm of a yoke member 91, which latter is rotatably mounted on a shaft 93 and straddles a ratchet wheel 94 fast to the shaft 93. The yoke member 91 is provided with a series of pawls 95 (FIG. 23), at least one of which is always in engagement with the ratchet wheel 94. At its inner end (see FIG. 17), the shaft 93 is provided with a sprocket wheel 96 coupled by means of a driving pin 97 to a disc 98 fixed to a shaft 99 on which is mounted the advancing roller 42 for the output strip 38. At its rear end, the lever 81 is provided with a lateral projection 101 (see FIG. 33) which is located beneath a cam 102 mounted on the adjusting shaft 57. As the main cam shaft 20 rotates during each cycle of operations, the cam 86 mounted thereon allows the spring 85 to act to rotate the two levers 80 and 81 upwardly about their pivotal axis 82. As the lever 80 thus rotates, it raises the link 87 and so advances the output strip 38 through the medium of the intermediate pawl and ratchet arrangement 95 and 94. This advance of the strip continues until the projection 101 on the inner lever 81 engages the cam 102 mounted on the adjusting shaft 57. Thus it is seen that the advance of the output strip during each cycle of operations is controlled by the degree of rotation of the lever 81. In consequence, when the adjusting shaft 57 is turned to change the point size of the line reproduction prior to the inauguration of a machine cycle of operation, the cam 102 is turned to a position where the advance of the strip 38 corresponds to the point size of the type line reproduced on the output strip.

In certain instances, however, it may be desirable to increase or decrease the distance the output strip moves in response to the setting of the cam 102 in order to increase or decrease the leading or linear distance between two successive type line reproductions on the output strip. For this reason, the lever 80 at its forward end is bifurcated to receive an adjusting wheel 104 (see FIGS. 32 and 33) which, by means of a set screw 105, is secured to a shaft 106 journaled in the bifurcated ends of the lever. The shaft 106, in turn, is provided with an eccentric pin 107 positioned in an elongated slot 108 formed in the lever 81, so that the two levers rotate in unison about their pivotal axis 82. By turning the adjusting wheel 104, the angular relationship of the two levers is either increased or decreased, with the result that the travel of the output strip is varied accordingly.

Figure 36:
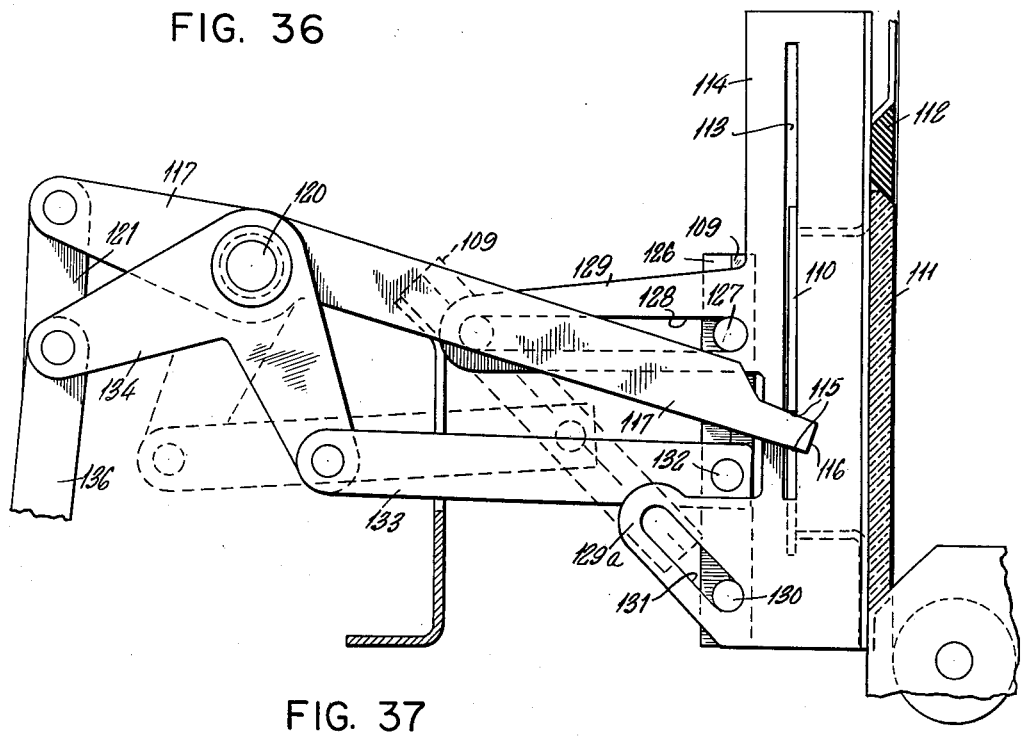
FIG. 36 is a side elevation of the viewing mirror and shutter with their actuating levers.
Figure 37:
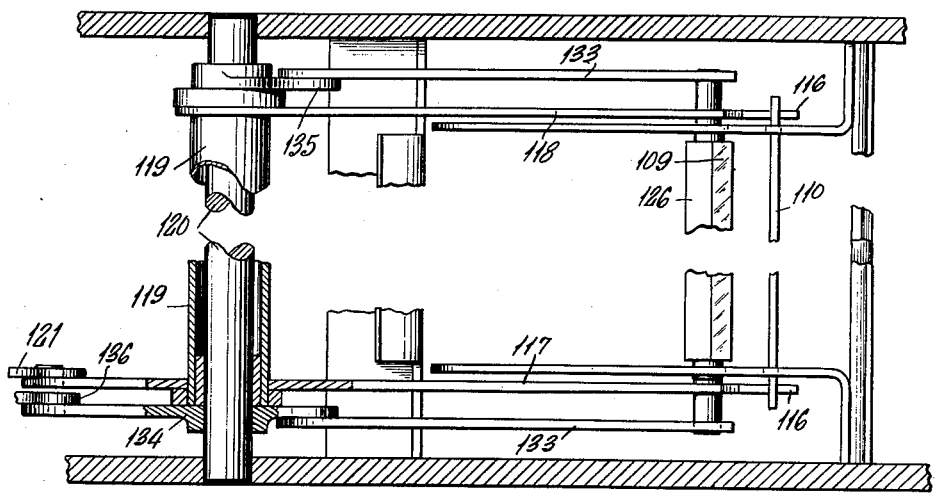
FIG. 37 is a top plan view of FIG. 36.

For make up purposes, it is desirable that means be provided to permit the operator to view the reproduction of the image prior to its exposure to the output strip. Accordingly, the machine is provided with a mirror 109 positioned in back of a shutter 110 (see FIGS. 1, 36 and 37) which is positioned between the mirror and a viewing screen 111 located in the front wall 112 of the machine. Normally, or when the machine is at rest, the mirror 109 occupies its inclined or image reflecting position and the shutter 110 occupies its upper or open position permitting the image of the type line to be seen on the viewing screen 111.

The shutter 110, at each of its ends, projects through and beyond vertical slots 113 formed in supporting brackets 114 and is provided at each of its ends with slots 115 to receive the forward ends 116 of two levers 117 and 118 connected together by a sleeve member 119 rotatably mounted on a shaft 120 journaled in the side frames of the machine. At its rear end, the lever 117 is pivotally connected to a link 121 at the upper end thereof. At its lower end (FIGS. 13 and 32), the link 121 is pivotally connected to a fore-and-aft lever 122 at the rear end thereof. At its forward end, lever 122 is pivotally mounted on the rod 82 and, intermediate its ends, it is provided with a roller 123 which, by means of a spring 124, is maintained in engagement with a cam 125 mounted on the cam shaft 20. During each cycle of operations, cam 125 acts through the train of connections described first to raise and then to lower the shutter 110.

The mirror 109 is mounted on a frame 126 (see FIGS. 36 and 37) carried by the supporting bracket 114. At its opposite ends, the frame 126 is provided with three pairs of studs. The two upper studs 127 are positioned in elongated horizontally disposed slots 128 formed in arms 129 which comprise a part of the brackets 114. The two lower studs 130 are positioned in angularly disposed slots 131 formed in arms 129a which also comprise a part of the brackets 114. The two intermediate studs 132 are fixed by a pair of links 133 to a pair of levers 134 and 135, one of which (134) is a bell crank lever. Both levers are connected to the shaft 120. At its rear end, the bell crank lever 134 is pivotally connected to a link 136 at the upper end thereof. The link 136, at its lower end, is pivotally connected to a lever 137 at the rear end thereof (FIG. 13). The lever 137 at its forward end is rotatably mounted on the shaft 82 and, intermediate its ends, it is provided with a roller 138 which rides on a cam 139 mounted on the cam shaft 20. During each cycle of operations, the cam 139 acts to raise and lower the link 136 and, through the bell crank lever 134 and the links 133, to rock the mirror 109 first forward and then rearward. By virtue of the pin and slot connections, the mirror in its rearward position will stand at an angle of 45° in the path of the light rays from the image mirrors 37 and in front of the viewing screen 111 (see FIGS. 1 and 36).

The main cam shaft 20 of the machine (see FIGS. 27, 28 and 31) is driven by a motor 141 through the medium of a pair of intermeshing gears 142 and a slip clutch 143. At the beginning of a cycle of operations, the shaft 20 is held against rotation by means of a stop pin 144 positioned in a hole 145 formed in the driven member 146 of the clutch 143.

The cycle of operations is inaugurated by closing a switch 147 (see FIG. 31) located at the front of the machine. When this switch is closed, it completes a circuit through a safety switch 149 and through a solenoid 150. When the solenoid is thus energized, it pulls the pin 144 out of engagement with the clutch member 146 through the medium of a suitable spring actuated lever arrangement 144a (FIGS 27 and 28) and so allows rotation of the cam shaft 20. Immediately thereafter, a cam 148 on the cam shaft opens the safetly switch 149 and so deenergizes the solenoid 150, at which time a spring acts to pull the pin 144 downwardly into peripheral engagement with the driven member 146 of the clutch 143. Then, as the cycle of operations continues, a cam 151 on the cam shaft 20 closes a switch 152 and completes a circuit through solenoid 35 which then acts to close the normally open lens shutters 31. Also, at this time, the screen shutter 110 is moved to its closed position under control of cam 125 and the viewing mirror is moved out of the path of projection under control of cam 139. As the cycle of operations continues, the circuit through the solenoid 35 is broken, whereupon the spring 36 acts to open the lens shutter 31 and thus expose light sensitive output strip 38 to the image on the input strip 1. Simultaneously therewith, the cam 153 on the main cam shaft 20 acts to close switch 154 to set the exposure meter 79. As soon as the exposure meter has been set, the pin 144 engages a second hole 155 in the driven clutch member 146 and so temporarily halts further rotation of the cam shaft 20 during the exposure period as determined by the setting of the meter 79. As the exposure meter returns to a point near its initial or home position, it closes a switch 156 which also completes a circuit through the solenoid 150 to again release the pin 144 from the driven clutch member and thus permit continued rotation of the shaft 20. When the meter returns to its home position, it opens the switch 156 and deenergises the solenoid 150, whereupon the spring acts to return the stop pin 144 into peripheral engagement with the driven member of the clutch. As the shaft continues to rotate, the circuit through the solenoid 35 is opened to close the lens shutters 31. Also, as the shaft continues to rotate, a cam 19 on the main cam shaft closes a switch 157 and thus completes a circuit through solenoid 21 to advance the input strip to bring the next succeeding line thereon to the photographic station. In addition, the spring 85 is free to act at this time to advance the output strip 38 as well as a translucent paper sheet 241, which latter will be described in detail later on. As the shaft nears the end of its rotation, the cam 139 acts to force the mirror 109, against the action of its spring 140, back to its initial position of rest in the path of projection. Also, as the shaft nears the end of its rotation, the circuit through solenoid 35 is closed to again open the lens shutters 31, and the cam 125 acts to reopen the screen shutter 110, thus exposing on the screen 111 the new type line brought into photographic position. Thereafter, as the shaft completes its cycle of rotation, the stop pin 144 is snapped back into engagement with the hole 145 in the driven clutch member 146, thus bringing the main cam shaft 20 to rest. At the end of this cycle of operation, a single type line from the input strip 1 has been reproduced on the output strip 38 either in enlarged or reduced form.

In certain instances, however, it may be desirable to reproduce a plurality of lines from the input strip in sequential order on the output strip without the need of closing the starting switch at the beginning of each cycle. To this end (see FIGS. 27, 29 and 30), a unit which comprises a disk 158, a Geneva wheel 159, and a hand wheel 160, is rotatably mounted on a stud 161 secured to the side frame of the machine. The Geneva wheel is provided with a wide non-operating notch 162 through which a crank pin 163, carried by a collar 164 secured to the main cam shaft 20, is free to rotate during a normal one-cycle operation. At this time, a latch 165, carried by a bracket 166 mounted on the main frame of the machine, is resting in a notch 167 on the disk 158 and beneath a switch 168. When it is desired to automatically inagurate two, three, four or more machine cycles of operation without interruption, the unit is turned manually by means of the hand wheel 160 to bring the first, second, third, etc., notch 169 into operative position with respect to the crank pin 163. Also, as the unit is turned, the latch 165 is forced upwardly and closes the switch 168. When the switch is closed, it completes a circuit through a coil 170 (see FIG. 31) which magnetizes a core member 171 positioned in back of the starting switch 147. In consequence, when the starting switch 147 is closed at the beginning of a cycle of operations, it is held closed by the magnetized core member 171. During each cycle of operations thereafter, the Geneva wheel 159 is turned back one notch. This continues until the wide gap 162 in the wheel is restored to its initial inoperative position with respect to the crank pin 163. At this time, the pawl 165 drops back into the notch 167 in the disk 158 and so opens the switch 168 to break the circuit through the locking coil 170. When this circuit is opened, the operating switch 147 at the front of the machine returns to its normal open position ready to be operated by hand.

After the desired reproduction of the type lines on the input strip 1 has been created on the output strip 38, it may be desirable to sever and remove that portion of the strip on which the reproductions were created. In consequence, the strip 38, as it enters the hopper 41, passes between a pair of knives 172 and 173. The knife 172 (see FIGS. 18, 19, 20 and 22) is pivoted at 184 to a cross member connected at its opposite ends to the sides of the light tight housing. The other knife 173 is fixedly secured to a like cross member also connected at its opposite ends to the sides of the housing. The pivotally mounted knife 172 is provided with a slot 174 in which a roller 175 is positioned. This roller is mounted on a crank pin 176 carried by a disk 177 mounted on one end of a shaft 178 journaled in the cross member. At its other end, the shaft 178 is provided with a pinion 179 which meshes with a rack 180 slidable in a groove formed in the cross member. At one end thereof, the rack is provided with a threaded portion 181 which extends into the hub of a knurled knob 182, the hub being rotatably secured to the cross member by means of a collar 183. When the knob 182 is turned, the knife 172 swings about its pivotal axis 184 and across the fixed knife 173 to sever the output strip 38. The knife is then returned to its normal position and the light tight receiver 41 removed and normally taken to the dark room when the exposed output strip may be safely removed for processing. As shown in FIG. 18, the receiver or cassette 41 is slidably secured to the lower knife and is removable as a unit.

In order to permit easy replacement of the roll of light sensitive material, the front and rear walls of the film housing 39, at their lower ends, are provided with horizontal flanges 185 (see FIG. 23) which ride between a plurality of sets of rollers 186 carried by channel members 187 mounted in telescopic fashion in channel members 188 secured at their ends to the machine frame (see also FIG. 26). By this arrangement the housing 39 and the contained parts may be removed as a unit from the machine.

In many instances, the operator may want to know when a predetermined amount of unexposed material remains in the roll 38 as well as when the roll has been depleted. To these ends, a roller 189 (see FIGS. 18 and 21), carried by a lever 190 fixed to a stub shaft 191 journaled in the sides of the housing 39, is maintained in contact with the roll 38 by means of a torsion spring 192. The shaft 191 projects through the wall of the housing 39 and has fixed thereto a second lever 193 which is provided at its free end with an offset roller 194 arranged below a pair of vertically spaced micro-switches 195 and 197 carried by a bracket secured to the machine frame. As the roll gradually decreases in size, the spring 192 acts to rotate the shaft 191 and so swing the two levers 190 and 193 upwardly. When only a predetermined amount of material is left in the roll, the roller 194 carried by the second lever 193 closes the lowermost micro-switch 195 and so completes a circuit through a light 196 (see FIG. 31) which when lit warns the operator that only this predetermined amount of material is left in the roll. Thereafter, when the roll has been depleted, the roller 194 closes the second micro-switch 197 and so completes a circuit through a different colored light 198 which when lit warns the operator of this fact.

For make up purposes, it is frequently desirable to prevent the automatic advance of the output strip 38 after the reproduction of a type line, as for example when it is desired to reproduce two successive lines from the input strip 1 in side-by-side relationship (or in longitudinal alignment) on the output strip. In consequence, there is provided a fore-and-aft push rod 199 (see FIGS. 34 and 35) which extends rearwardly from beyond the front wall of the machine. At its forward end, the rod is provided with a hand knob 200 for ease of operation. At its rear end, the rod 199 is slidably mounted in a bracket 201, secured to the main frame of the machine, and in line with a notch 202 formed in the vertically disposed film advancing link 87. Hence, if the rod is pushed rearwardly before the inauguration of a machine cycle, it will enter the notch 202 and, by preventing the rise of the link 87 under the influence of the spring 85, the output strip 38 will be locked against advance during this machine cycle. Intermediate its ends, the rod 199 is provided with an open slot 203 in which is positioned a pin 204 carried by a vertically disposed lever 205 at the upper end thereof. At its lower end, the lever 205 is pivotally secured to a fixed bracket 206 secured to the base of the machine. Intermediate its ends, the lever 205 is provided with a tooth portion 207. At the end of a machine cycle, a plate 208, secured to the side face of the cam 125, engages the tooth portion 207 and forces the link 199 forwardly out of engagement with the film advancing link 87, thus leaving the link free to advance the output strip 38 during the next cycle of operations.

Also for make up purposes it is also desirable to adjust the input strip 1 vertically and/or horizontally with respect to the optical axis after the strip has been advanced to bring a type line to the photographic station. For example, adjustments of this nature are of advantage when it is desired to reproduce two or more type lines of a small point size alongside one type line of a large point size, as is frequently the case when making up grocery advertisements. Accordingly, the frame member 9 of the carriage 8 is provided with an upper rail and a lower rail. The lower rail 209 (see FIG. 5) rests on a pair of rollers 210 carried by a pair of bell crank levers 211 pivotally secured to a cross member 212 fixed to the main frame of machine. The upper rail 213 is positioned beneath a third roller 214 carried by a bell crank lever 215 pivotally secured to a cross member 216 fixed to the main frame of the machine. This third bell crank lever 215 is biased by means of a spring 215ª to insure that the two lower rollers 210 remain in tracking engagement with the lower rail 209. In addition, the ends of all three roller carrying levers are bifurcated and straddle their supporting rails to insure that the carriage and hence the input strip are maintained in true vertical position. The depending arms 217 of the two lower levers 211 are pivotally connected to a horizontally disposed actuating member 218. This member 218, at one end thereof and by virtue of the weight of the input carriage 8, is maintained in engagement with the face of a cam 219 secured to a fore-and-aft shaft 220 at the rear end thereof. The shaft extends forwardly beyond the front face of the machine and is provided with a knob 221 for rotating the shaft 220 and hence the cam 219 (FIG. 2). As the cam is thus rotated in one direction or another, the rod 218 is displaced and through the medium of the two bell crank levers 211 raises or lowers the carriage 8 to a corresponding extent.

The two cross members 212 and 216, which carry the above described bell crank levers, are connected together by a bridge member 222 having a ledge 223 which projects above the lower cross member 212 (FIGS. 5 and 6). A rack 224 is slidably mounted in oppositely disposed grooves formed in the ledge 223 and the lower cross member 212, respectively. A plunger 225, having an operating knob 226 at one end thereof, is slidably mounted in the rack 224. At its other end, the plunger carries a pin 227 that normally engages a slot 228 formed in the lower rail 209. This slot is elongated in a vertical direction to permit the carriage 8 to be adjusted vertically in the manner above described. The bridge member 222 is also provided with a hub 229 (FIG. 4) in which is journaled a fore-and-aft shaft 230. At this rear end, the shaft 230 is provided with a pinion 231 that meshes with the teeth on the rack 224. At its front end, the shaft is provided with a gear 232. This gear 232 meshes with an intermediate gear 233 (see FIG. 3) mounted on a stud carried by a flange 234 that extends outwardly from the hub 229. The intermediate gear 233, in turn, meshes with a third gear 235 fast to the rear end of a fore-and-aft shaft 236, which latter is journaled at its rear end in flange 234 and at its front end in the front wall of the machine. The shaft 236 extends forwardly beyond the front wall and is provided with a hand wheel 237 by means of which the pinion 231 may be turned in one direction or another through the medium of the intermediate connections just described. As the pinion 231 is thus turned, the carriage 8 is moved horizontally in one direction or another with respect to the optical axis.

A dial 237$^a$ is associated with the hand wheel 237 to indicate the position of the carriage 8 (see FIGS. 2 and 3). This dial is connected to and operated by the shaft 236 through gearing 236$^a$ (FIG. 4). Normally, the carriage 8 will occupy a central position with reference to the lens 30 but may be moved in either direction from such position for a distance of 30 ems. Hence, the dial is formed with two em scales reading in opposite directions from a zero position.

It is also contemplated that the input carriage 8 may be mounted for a tilting adjustment in any of its different positions in order that the type line image may appear at an angle on the output strip. No such mounting is shown in the drawings since the details are not important.

When it is desired to move the carriage 8 to a position for changing the input strip 1, the pin 227 on the rack 224 is withdrawn from the slot 228 in the rail 209, and the carriage 8 is then free to be pulled manually in an endwise direction between the rollers on the rails. To give additional support to the carriage during its removal, another pair of rollers 238 are mounted on the upper and lower cross members (see FIG. 5).

In the event it is desired to advance the input strip 1 without inaugurating a machine cycle of operations, it may be done by means of a switch 239 (see FIG. 31) which also completes a circuit through the input strip advancing solenoid 21.

In addition, the machine is provided with another switch 240 (see FIG. 31) which serves to prevent the advance of the input strip during a machine cycle of operation. Normally, this switch is closed. When opened, it prevents the energization of the input strip advancing solenoid 21. This makes possible the repeated reproduction of a particular line any desired number of times as is necessary for "pasteup" purposes in display page make-up.

Also for make up purposes, a sheet of translucent paper 241 (FIG. 2) is fed upwardly from a roll 242, stored in a hopper, past the viewing screen 111 and is detachably connected at its leading end, by means of clips 241$^a$, to the lower end of an apron 243$^a$ of an automatic take-up roller 243 (see also FIG. 3) positioned at the top of the machine. The sheet of paper 241 (see FIG. 14) is trained between a pair of feed rollers, one of which (the roller 244) is carried by a shaft 245 journaled in side frames of the machine. This shaft 245 is provided at one end thereof with a wide gear 246 (FIG. 15). The other feed roller 247 is mounted on a shaft 248 journaled at its opposite ends in a pair of arms 249 pivotally mounted on the side frames of the machine. The shaft 248 is provided with a narrow gear 250 which, by means of a spring 251 pressing against one of the arms 249, is maintained in mesh with the wide gear 246, a stop 252 being provided to limit the pressure between the gears. Another narrow gear 253 is maintained in mesh with the wide gear 146. This further gear 253 is mounted on a stud 254 carried by a depending arm 255, which latter is adjustably mounted on another stud 256 carried by the main frame of the machine. The stud 254 is also provided with a sprocket wheel 257. A chain 258 (FIG. 17), trained over this sprocket wheel 257 and the driven sprocket wheel 96 which advances the output strip 38, serves to rotate the two feed rollers 244 and 247 and so advance the sheet of paper 241. By this arrangement, the advance of the paper is in unison with and at the same rate of speed as the advance of the output strip. In order that the tension on the chain 258 may be adjusted, if need be, to insure steady advance of the paper, the shaft 245 and the stud 256 are in axial alignment, with the result that when the set screw 259 is backed off and the arm turned, the distance between the two sprocket wheels may be lengthened while the two gears 246 and 253 are kept in mesh with each other.

The translucent sheet 241 will ordinarily be prepared in graph form to serve as a chart or layout to guide the operator in making up the output strip from the input strip. It will be remembered that the type lines on the input strip are arranged, one after another, in column formation and that these type lines must be reproduced on the output strip in various point sizes and in various locations. The translucent sheet may be prepared in advance to give the operator full information but, failing that, the sheet will nevertheless enable the operator as he proceeds with the composition to mark off on the sheet whatever space has been used up on the output strip by each reproduced line. Hence it is even possible to employ a plain translucent sheet for marking up purposes, assuming the operator knows in advance the page set up.

It may be explained that the type lines on the input strip will ordinarily be of 18 pt. size and of any length up to 30 ems. In some instances, the type lines will be reproduced in smaller point sizes, but, in most instances, they will be reproduced in larger point sizes, all depending upon the desired make up of the final film to be produced. This flexibility comes from the adjustability of the two object mirrors 29 and the two image mirrors 37 which provide for a wide variation in point size without having to adjust either the input strip or the output strip. Moreover, the horizontal adjustment of the input strip carriage provides for a further wide variation in location of the reproduced type lines columnwise or across the page. The vertical adjustment of the input carriage allows for variable spacing of the reproduced type lines on the output strip.

The viewing screen 111 plays an important part in the make up of the output strip. After each photographic action, the type line next to be photographed will appear on the screen, its point size and location being the same as the previously photographed line. If a change of point size is called for, the mirrors will be adjusted by turning the hand wheel 62, using the scale 68 as a guide, or until the dimensions of the line fill the indicated area on the translucent layout sheet. If a change of lateral position is called for, the input strip carriage will be adjusted in one direction or the other by turning the knob 237, using the scale 237$^a$ as a guide. If a change of vertical position is called for, the input strip carriage will be adjusted upwardly or downwardly by turning the knob 221, which also has a scale (not shown) associated therewith. All of these changes will be seen through the translucent sheet which, if in the form of a layout sheet, will guide the operator in making the changes or which, if blank, may be marked off in accordance with the space to be occupied by the type line about to be reproduced. The operator may then proceed with the next photographic action by closing the starting switch 147. In some instances, as explained in the body of the specification, the input strip advancing means may be temporarily disabled by operating the switch 240 to avoid a change of type line image during any given machine cycle and, moreover, the output strip advancing means may be temporarily disabled by pushing the button 200 to avoid any advance of the output strip during any given machine cycle.

It will thus be seen that the machine is highly flexible in use, permitting the output strip to be made up in page form according to any desired layout. It will be understood, of course, that the input strip will be prepared as to text in accordance with the desired layout, even though the type lines may all be of the same point size and in straight column formation. The lengths of the type lines on the input strip may or may not vary, according to the text matter to be reproduced, it being understood that any reduction or enlargement of a type line image for a change of point size will involve a corresponding (proportional) change in the length of the reproduced type line on the output strip.

In the accompanying drawings, the invention has been shown in preferred form and merely by way of example, and many changes and variations may be made in the construction and operation of the parts. It will therefore be understood that the invention is not limited to any specific embodiment or procedure except insofar as such limitations are specified in the appended claims.

What is claimed is:

1. In a photographic reproducing machine, the combination of an input strip holder, an output strip holder, optical means for projecting an image from the input strip onto the output strip to create on the later a reproduction of said image, said optical means including a lens assembly, a first set of mirrors arranged between the input strip and the lens assembly and serving to direct through the lens assembly the light rays of the image projected from the input strip, said first set of mirrors being movably mounted for adjustment relatively to the input strip and the lens assembly to change the object distance between the input strip and the lens assembly and thereby vary the size of the image produced by the lens assembly, and a second set of mirrors arranged between the lens assembly and the output strip and serving to direct the light rays emerging from the lens assembly onto the output strip, said second set of mirrors being movably mounted for adjustment relatively to the lens assembly and the output strip to change the image distance between the lens assembly and the output strip according to the change in the object distance between the input strip and the lens assembly so as thereby to preserve the size of the image produced by the lens assembly, and mechanism for effecting corresponding adjustments of the two sets of mirrors in a definite ratio determined by the size of the image to be reproduced on the tape while the lens assembly, the input strip holder and the output strip holder remain in fixed relation to each other.

2. A combination according to claim 1, including periodically operated means for automatically advancing the output strip one step after the reproduction of each image thereon, and means responsive to the operation of the mirror adjusting mechanism for varying the step advance of the output strip in accordance with the size of the reproduced image.

3. A combination according to claim 1, wherein the output strip is substantially wider than the input strip and wherein the object mirrors and the image mirrors are as long as the output strip is wide to permit the lateral location of the projected images on the output strip to be varied.

4. A combination according to claim 3, wherein the input strip holder and the lens assembly are relatively adjustable in a direction crosswise of the input strip to vary the lateral location of the reproduced image on the output strip.

5. A combination according to claim 1, including a stationary viewing screen arranged between the second adjustable set of mirrors and the output strip but out of the path of projection of the image, and a mirror also arranged between the second adjustable set of mirrors and the output strip and normally positioned in the path of projection of the image so as to reflect the image of the same size produced by the lens assembly onto the screen before it is projected onto the output strip, said mirror being mounted for movement out of the path of projection of the image to permit the image to be reproduced on the output strip.

6. A combination according to claim 5, including a translucent layout sheet mounted in front of the viewing screen and movable with respect thereto, said layout sheet rendering visible to the operator the reproduced image reflected onto the screen and adapted to bear markings which will guide the operator in controlling the size and location of the reproduced images on the output strip.

7. A combination according to claim 5, including a cyclically operated main cam shaft, means for rotating said shaft, means actuated by one of the cams on said shaft during its rotation for advancing the output strip, and means actuated by another cam on said shaft during its rotation for first moving the reflecting mirror out of the path of projection of the image to permit the image to be reproduced on the output strip and thereafter moving said mirror back into the path of projection of the image to reflect onto the viewing screen the next image to be reproduced.

8. A combination according to claim 6, including a cyclically operated main cam shaft, means for rotating said shaft, means actuated by a cam on said shaft during its rotation for first moving the reflecting mirror out of the path of projection of the image to permit the image to be reproduced on the output strip and thereafter moving said mirror back into the path of projection of the image to reflect onto the screen the next image to be reproduced, means actuated by another cam on said shaft during its rotation for advancing the output strip after each reproduction has been created thereon to bring an unexposed portion thereof into the path of projection of the image to be reproduced, and means actuated by still another cam on said cam shaft during its rotation for moving the translucent layout sheet with respect to the viewing screen, the same distance that said output strip is advanced.

9. In a photographic reproducing machine, the combination of a holder adapted to receive an input strip having a plurality of spaced apart type line images to be reproduced, means for positioning the strip with one of its images at the photographic station, a holder for an output strip of light sensitive material, means including a lens assembly for projecting said image onto said output strip, a stationary viewing screen, a mirror normally positioned in the path of projection between said lens assembly and said output strip for reflecting a reproduction of said type line image onto said screen, a translucent layout sheet positioned in front of said viewing screen and movable with reference thereto, said layout sheet rendering visible to the operator the reproduced image reflected onto the screen and adapted to bear markings which will guide the operator in controlling the size and location of the reproduced images on the output strip, means for moving said mirror out of the path of projection whereby a reproduction of said type line image may be created on the output strip, means for thereafter advancing said output strip one step to bring an unexposed portion thereof into the path of projection for the next succeeding type line image, and means for moving said translucent sheet past said viewing screen the same distance the output strip is step advanced after said reproduction is created thereon, together with timing mechanism for controlling the operation of the input strip positioning means, the mirror moving means, the output strip advancing means, and the translucent sheet advancing means during each cycle of operation of the machine.

10. A combination according to claim 9, including means independent of the strip positioning means for adjusting said input strip holder relatively to the lens assembly to vary the position of the photographic station in a direction lengthwise of the input strip and thus to correspondingly vary the position of the reproduction on the output strip.

11. A combination according to claim 9, including means independent of the input strip positioning means for adjusting said input strip holder relatively to the lens assembly to vary the position of the photographic station in a direction crosswise of the input strip and thus to correspondingly vary the position of the reproduction on the output strip.

12. In a photographic reproducing machine, the combination of a holder adapted to receive an input strip having a plurality of spaced apart images to be reproduced, means for advancing the strip lengthwise in said holder to bring a selected image thereon into photographic position, means for adjusting said holder in a direction crosswise of the strip to alter the photographic position of the selected image, a stationary holder adapted to receive an output strip of light sensitive material, means for advancing the output strip lengthwise in said holder, optical means for projecting the selected image of the input strip onto the output strip in any photographic position of said image, a stationary holder for a layout sheet on which the projected image may be viewed before it is projected onto the output strip, said layout sheet adapted to bear markings which will guide the operator in controlling the size and location of the reproduced images on the output strip, means for advancing the layout sheet lengthwise in its holder, and connections between the advancing means for the output strip and the advancing means for the layout sheet whereby the two are advanced in unison.

13. In a photographic reproducing machine, the combination of a holder adapted to receive an input strip having a plurality of spaced apart images to be reproduced, means for advancing the strip lengthwise in said holder to bring a selected image thereon into photographic position, means for adjusting said holder in a direction crosswise of the strip to alter the photographic position of the selected image, a stationary holder adapted to receive an output strip of light sensitive material, means for advancing the output strip lengthwise in said holder, optical means for projecting the selected image of the input strip onto the output strip in any photographic position of said image, a stationary viewing screen on which the projected image may be viewed before it is projected onto the output strip, a stationary holder for a layout sheet of translucent material to overlay the viewing screen, said layout sheet adapted to bear markings which will guide the operator in controlling the size and location of the reproduced images on the output strip, means for advancing the layout sheet lengthwise in its holder with reference to the viewing screen, and connections between the advancing means for the output strip and the advancing means for the layout sheet whereby the two are advanced in unison.

14. In a photographic reproducing machine, the combination of a holder adapted to receive an input strip having a plurality of spaced apart images to be reproduced, means for advancing the strip in said holder to bring an image thereon to the photographic station, a holder for an output strip of light sensitive material, means including a lens assembly for projecting said image from the input strip onto said output strip to create on the latter a reproduction of said image, means for changing the image distance and the object distance to vary the size of the reproduction, and means for effecting a relative adjustment of said input strip holder and said lens assembly without changing the object distance between the input strip and the lens assembly to vary the position of the photographic station in a direction lengthwise of the input strip and thus to correspondingly vary the position of the reproduction on the output strip.

15. In a photographic reproducing machine, the combination of a holder adapted to receive an input strip having a plurality of spaced apart images to be reproduced, means for advancing the strip in said holder to bring an image thereon to the photographic station, a holder for an output strip of light sensitive material, means including a lens assembly for projecting said image from the input strip onto said output strip to create on the latter a reproduction of said image, means for changing the image distance and the object distance to vary the size of the reproduction, and means for effecting a relative adjustment of said input strip holder and said lens assembly without changing the object distance between the input strip and the lens assembly to vary the position of the photographic station in a direction crosswise of the input strip and thus to correspondingly vary the position of the reproduction on the output strip.

16. In a photographic reproducing machine, the combination of a holder adapted to receive an input strip having a plurality of spaced apart images to be reproduced, means for advancing the strip lengthwise in said holder to bring a selected image thereon into photographic position after a photographic action, a stationary holder adapted to receive an output strip of light sensitive material, means for advancing the output strip lengthwise in said holder after a photographic action, an optical system for projecting a selected image of the input strip onto the output strip, said optical system including a lens assembly and a normally open shutter associated with said lens assembly, means for first closing the shutter prior to a photographic action and then reopening the shutter to effect such a photographic action, a stationary viewing screen on which the projected image may be viewed before it is projected onto the output strip, a mirror associated with said screen and normally positioned in the path of projection of the image so as to reflect the image onto the screen before it is projected onto the output strip, said mirror being movable out of the path of projection of the image prior to a photographic action and later back into said path after such a photographic action, means for effecting such movements of the mirror, a normally open shutter associated with the viewing screen, means for first closing the shutter prior to a photographic action and then reopening the shutter after such a photographic action, a stationary holder for a layout sheet of transparent material to overlay the viewing screen, said layout sheet being adapted to bear markings which will guide the operator in controlling the size and location of the reproduced images on the output strip, means for advancing the layout sheet lengthwise in its holder with reference to the viewing screen after a photographic action, automatic mechanism for operating the input strip advancing means, the output strip advancing means, the lens shutter closing and reopening means, the mirror moving means, the screen shutter closing and reopening means, and the layout sheet advancing means in proper timed relation during a machine cycle, and manually controlled means for initiating the operation of said automatic mechanism.

17. A combination according to claim 16, wherein the automatic mechanism comprises a one-revolution rotary power operated shaft provided with a series of cams which control the operation of the various aforesaid means in proper sequence.

References Cited in the file of this patent

UNITED STATES PATENTS

| | | |
|---|---|---|
| 730,583 | Stender | June 9, 1903 |
| 1,235,685 | Hansch | Aug. 7, 1917 |
| 1,344,896 | Jobke | June 29, 1920 |
| 1,777,419 | Ross | Oct. 7, 1930 |
| 1,894,004 | Rose | Jan. 10, 1933 |
| 1,975,439 | Uher | Oct. 2, 1934 |
| 2,010,561 | Ogden | Aug. 6, 1935 |
| 2,075,201 | Jones | Mar. 30, 1937 |
| 2,158,039 | Wenczler | May 9, 1939 |
| 2,176,910 | Levy | Oct. 24, 1939 |
| 2,356,620 | Schade | Aug. 22, 1944 |
| 2,411,694 | Place | Nov. 26, 1946 |
| 2,431,612 | Furnas | Nov. 25, 1947 |
| 2,439,055 | Pratt et al. | Apr. 6, 1948 |

(Other references on following page)

UNITED STATES PATENTS

| | | | |
|---|---|---|---|
| 2,487,671 | Pratt | Nov. 8, | 1949 |
| 2,493,998 | Pratt et al. | Jan. 10, | 1950 |
| 2,517,250 | Shea | Aug. 1, | 1950 |
| 2,552,990 | McKay | May 15, | 1951 |
| 2,673,488 | Bumstead | Mar. 30, | 1954 |
| 2,687,072 | Lohr | Aug. 24, | 1954 |
| 2,691,924 | Plastaras | Oct. 19, | 1954 |
| 2,701,991 | Croucher | Feb. 15, | 1955 |
| 2,725,802 | Snyder | Dec. 6, | 1955 |
| 2,744,443 | Higonnet et al. | May 8, | 1956 |